United States Patent
Zhao et al.

(10) Patent No.: US 10,922,604 B2
(45) Date of Patent: *Feb. 16, 2021

(54) TRAINING A MACHINE LEARNING MODEL FOR ANALYSIS OF INSTRUCTION SEQUENCES

(71) Applicant: Cylance Inc., Irvine, CA (US)

(72) Inventors: Xuan Zhao, Irvine, CA (US); Matthew Wolff, Laguna Niguel, CA (US); John Brock, Irvine, CA (US); Brian Wallace, Irvine, CA (US); Andy Wortman, Irvine, CA (US); Jian Luan, Irvine, CA (US); Mahdi Azarafrooz, Irvine, CA (US); Andrew Davis, Portland, OR (US); Michael Wojnowicz, Irvine, CA (US); Derek Soeder, Irvine, CA (US); David Beveridge, Portland, OR (US); Eric Petersen, Portland, OR (US); Ming Jin, Irvine, CA (US); Ryan Permeh, Irvine, CA (US)

(73) Assignee: Cylance Inc., Irvine, CA (US)

( * ) Notice: Subject to any disclaimer, the term of this patent is extended or adjusted under 35 U.S.C. 154(b) by 545 days.

This patent is subject to a terminal disclaimer.

(21) Appl. No.: 15/345,436

(22) Filed: Nov. 7, 2016

(65) Prior Publication Data
US 2018/0075349 A1    Mar. 15, 2018

Related U.S. Application Data

(60) Provisional application No. 62/385,906, filed on Sep. 9, 2016.

(51) Int. Cl.
*G06N 3/04* (2006.01)
*G06N 3/08* (2006.01)
*G06F 21/56* (2013.01)

(52) U.S. Cl.
CPC ......... *G06N 3/0445* (2013.01); *G06F 21/563* (2013.01); *G06N 3/084* (2013.01)

(58) Field of Classification Search
CPC ..... G06N 3/0445; G06N 3/084; G06F 21/563
See application file for complete search history.

(56) References Cited

U.S. PATENT DOCUMENTS

| | | | |
|---|---|---|---|
| 2015/0096018 A1* | 4/2015 | Mircescu | G06F 21/56 726/23 |
| 2015/0278123 A1 | 10/2015 | Nayshtut et al. | |

(Continued)

OTHER PUBLICATIONS

Vinyals, Oriol, et al. "Show and tell: A neural image caption generator." Proceedings of the IEEE conference on computer vision and pattern recognition. 2015. (Year: 2015).*

(Continued)

*Primary Examiner* — Alexey Shmatov
*Assistant Examiner* — Sehwan Kim
(74) *Attorney, Agent, or Firm* — Jones Day

(57) ABSTRACT

In one respect, there is provided a system for training a neural network adapted for classifying one or more instruction sequences. The system may include at least one processor and at least one memory. The memory may include program code which when executed by the at least one processor provides operations including: training, based at least on training data, a machine learning model to detect one or more predetermined interdependencies amongst a plurality of tokens in the training data; and providing the trained machine learning model to enable classification of one or more instruction sequences. Related methods and articles of manufacture, including computer program products, are also provided.

22 Claims, 12 Drawing Sheets

(56) References Cited

U.S. PATENT DOCUMENTS

2016/0180215 A1 6/2016 Vinyals et al.
2017/0257385 A1* 9/2017 Overson ............. H04L 67/2823

OTHER PUBLICATIONS

Dai, Andrew M., and Quoc V. Le. "Semi-supervised sequence learning." Advances in neural information processing systems. 2015. (Year: 2015).*

Tobiyama, Shun, et al. "Malware detection with deep neural network using process behavior." 2016 IEEE 40th Annual Computer Software and Applications Conference (COMPSAC). vol. 2. IEEE, 2016. (Year: 2016).*

Dam, Hoa Khanh, Truyen Tran, and Trang Pham. "A deep language model for software code." arXiv preprint arXiv:1608.02715 (2016). (Year: 2016).*

Piech, Chris, et al. "Learning program embeddings to propagate feedback on student code." arXiv preprint arXiv:1505.05969 (2015) . (Year: 2015).*

Huang, Zhiheng, Wei Xu, and Kai Yu. "Bidirectional LSTM-CRF models for sequence tagging." arXiv preprint arXiv:1508.01991 2015). (Year: 2015).*

Dam, Hoa Khanh, Truyen Tran, and Trang Pham. "A deep language model for software code." arXiv preprint arXiv: 1608.02715 (2016). (Year: 2016).*

Piech, Chris, et al. "Learning program embeddings to propagate feedback on student code." arXiv preprint arXiv: 1505.05969 (2015). (Year: 2015).*

Huang, Zhiheng, Wei Xu, and Kai Yu. "Bidirectional LSTM-CRF models for sequence tagging." arXiv preprint arXiv: 1508.01991 (2015). (Year: 2015).*

Vinyals, Oriol, et al. "Show and tell: A neural image caption generator." Proceedings of the IEEE conference on computer vision and pattern recognition. 2015. (Year: 2015).*

Dai, Andrew M., and Quoc V. Le. "Semi-supervised sequence learning." Advances in neural information processing systems. 2015. (Year: 2015).*

Socher, Richard, et al. "Recursive deep models for semantic compositionality over a sentiment treebank." Proceedings of the 2013 conference on empirical methods in natural language processing. 2013. (Year: 2013).*

Li, Jia, et al. "Tweet modeling with LSTM recurrent neural networks for hashtag recommendation." 2016 International Joint Conference on Neural Networks (IJCNN). IEEE, 2016. (Year: 2016).*

Mikolov, Tomas, et al. "Distributed representations of words and phrases and their connpositionality." Advances in neural information processing systems. 2013. (Year: 2013).*

O'Donnell, Charles W., "Learning Hidden Instruction Sequences using Support Vector Machine Classification," Machine Learning, 6:1-5 (2004).

Iwamoto et al., "Malware classification based on extracted api sequences using static analysis," Proceedings of the Asian Internet Engineeering Conference, pp. 31-38 (2012).

Mikolov et al., "Distributed representations of words and pharses and their compositionality," Advances in neural information processing systems, pp. 1-9 (2013).

Sergienya et al., "Learning better embeddings for rare words using distributional representations," Proceedings of the 2015 Conference on Empirical Methods in Natural Processing, pp. 280-286 (2015).

* cited by examiner

TRAINING A MACHINE LEARNING MODEL FOR ANALYSIS OF INSTRUCTION SEQUENCES

RELATED APPLICATION

This application claims priority under 35 U.S.C. § 119(e) to U.S. Provisional Application No. 62/285,906 entitled TRAINING A MACHINE LEARNING MODEL FOR SCRIPT ANALYSIS and filed on Sep. 9, 2016, the disclosure of which is incorporated herein by reference in its entirety.

TECHNICAL FIELD

The subject matter described herein relates generally to machine learning and more specifically to the use of machine learning models in the classification of instruction sequences.

RELATED ART

A script (e.g., a server or client side script) may include one or more instructions that automate the performance of one or more tasks that may otherwise require manual execution (e.g., by a human operator). In general, a script may be written in a scripting language (e.g., JavaScript, Python, Perl, Visual Basic for Applications (VBA)) and may be executed without compilation. Scripts may also be embedded features (e.g., directly or as links) that execute along with other program code for rendering a particular environment. For instance, opening a file (e.g., a Portable Document Format (PDF) file) may trigger the execution of one or more scripts (e.g., JavaScripts) embedded within the file, thereby prompting the performance of the tasks specified by the scripts. In this manner, malicious scripts (e.g., malware) may be embedded in a file to introduce undesirable and/or harmful behavior.

SUMMARY

Systems, methods, and articles of manufacture, including computer program products, are provided for detecting malicious instruction sequences. In some example embodiments, there is provided a system that includes at least one processor and at least one memory. The at least one memory may include program code that provides operations when executed by the at least one processor. The operations may include: processing an instruction sequence with a trained machine learning model configured to detect one or more interdependencies amongst a plurality of tokens in the instruction sequence and determine a classification for the instruction sequence based on the one or more interdependencies amongst the plurality of tokens; and providing, as an output, the classification of the instruction sequence.

In some variations, one or more features disclosed herein including the following features can optionally be included in any feasible combination. The instruction sequence may be a script that can be executed without compilation. The one or more interdependencies may include a presence, in the instruction sequence, of a first token subsequent to at least a second token. The one or more interdependencies may indicate at least one function and/or behavior associated with the instruction sequence.

In some variations, the trained machine learning model may be a trained neural network. The trained neural network may be a trained long short-term memory neural network. The trained long short-term memory neural network may include a first long short-term memory layer. The first long short-term memory layer may include a memory cell having an input gate, an output gate, and a forget gate. The first long short-term memory layer may be configured to receive a first token from the plurality of tokens included in the instruction sequence. The first long-short term memory layer may be associated with a hidden state corresponding to one or more tokens already processed by the first long short-term memory layer. A current state and/or an output of the first long-short-term memory layer may be determined based at least on the first token and the hidden state In some variations, the trained long short-term memory neural network may further include a second long short-term memory layer. The first long short-term memory layer may be configured to detect one or more interdependencies in one direction by at least processing the plurality of tokens in a forward order. The second long short-term memory layer may be configured to detect one or more other interdependencies in an opposite direction by at least processing the plurality of tokens in an opposite order.

In some variations, the trained neural network may be a trained recursive neural tensor network and processing the instruction sequence may include processing an abstract syntax tree representation of the instruction sequence. The operations may further include generating, based at least on a structure of the plurality of tokens in the instruction sequence, the abstract syntax tree representation of the instruction sequence, wherein the abstract syntax tree representation of the instruction sequence includes a parent node corresponding to a first token from the plurality of tokens in the instruction sequence, a first leaf node corresponding to a second token from the plurality of tokens in the instruction sequence, and a second leaf node corresponding to a third token from the plurality of tokens in the instruction sequence. At least one of the first leaf node and the second leaf node may be a child node of the parent node. The parent node may be associated with a weight that is determined based at least on a first weight and a first tensor associated with the first leaf node, and a second weight and a second tensor associated with the second leaf node. The parent node may be a root node of the abstract syntax tree, and the classification of the instruction sequence may be determined based at least on the weight associated with the parent node.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1A:
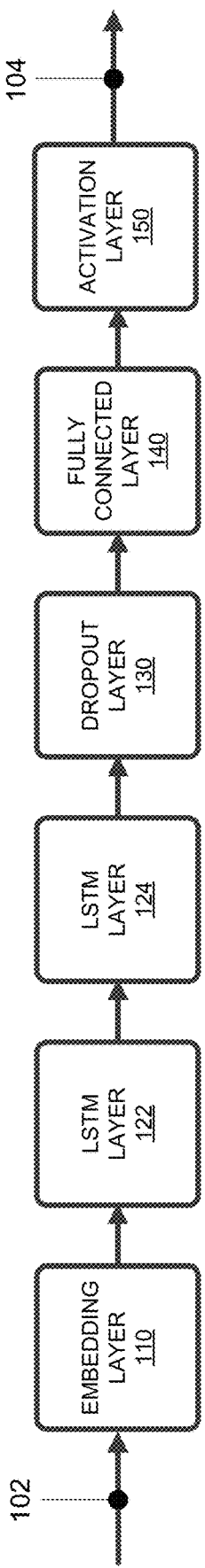
FIG. 1A depicts a long short-term memory neural network, in accordance with some example embodiments.

A neural network may be trained to classify a sequence of one or more instructions. For example, the instruction sequence may be part of a script (e.g., written in a scripting language), which can be executed without compilation. Alternately and/or additionally, the instruction sequence may be in a programming language that requires compilation prior to execution. The instruction sequence may include a sequence of tokens. The tokens in an instruction sequence may be the individual terms that appear in the instruction sequence including, for example, var, if, while, and/or the like. A single token may include one or more characters and/or binary digits. For example, the token "if" may include the characters "i" and "f." Alternately and/or additionally, the token "if" may be represented in binary digits of 1s and 0s. It should be appreciated that an entire instruction sequence may be treated as a single token. The neural network may be trained using supervised learning (e.g., backward propagation of errors) and/or optimization techniques (e.g., gradient descent and/or the like) to minimize the error or loss present in the neural network's classification of different instruction sequences, such as whether an instruction sequence is malicious or benign. However, classifying an instruction sequence may require the neural network to be able to recognize interdependencies between multiple tokens within the instruction sequence. As such, the neural network may, given the length of the instruction sequence instruction sequence, lack sufficient memory to be able to learn the interdependencies among a lengthy sequence of tokens.

In some example embodiments, a machine learning model may be trained to classify instruction sequences. The machine learning model may be a neural network including, for example, a long short-term memory (LSTM) neural network, a recursive neural tensor network (RNTN). It should be appreciated that any type of machine learning model may be used without departing from the scope of the present disclosure. Furthermore, more than one machine learning model may be trained and used to classify instruction sequences.

In some example embodiments, a long short-term memory neural network may be trained to classify instruction sequences by at least using the long short-term memory neural network to process a plurality of training data. The training data may include at least one instruction sequence that includes tokens having predetermined interdependencies. Thus, the long short-term memory neural network may be trained to correctly detect the predetermined interdependencies amongst the tokens in the training data. The long short-term memory neural network may be trained, such via supervised learning and/or optimization techniques, to minimize an error function or a loss function associated with a corresponding output of the long short-term memory neural network. It should be appreciated that unsupervised learning techniques, such as anomaly detection and/or the like, may also be used to train the long short-term memory neural network without departing from the scope of the present disclosure.

The long short-term memory neural network may include at least one long short-term memory layer configured to process the sequence of tokens included in each training instruction sequence. The long short-term memory layer may process a sequence of tokens while selectively retaining information from processing one or more earlier tokens in the sequence of tokens. As such, the long short-term memory neural network may have the memory to learn the interdependencies between multiple tokens within an instruction sequence, even when the instruction sequence includes a lengthy sequence of tokens. The predetermined interdependencies between the tokens in a training instruction sequence may include a presence of a token in the instruction sequence after one or more other tokens. These interdependencies may indicate that the instruction sequence exhibits particular function or behavior. For example, the long short-term memory neural network may be able to learn the interdependency between the token "if" and the token "else." When trained, the long short-term memory neural network may then be used to classify other instruction sequences that are provided as an input to the long short-term memory neural network.

In some example embodiments, the long short-term memory neural network may be configured process a sequence of tokens while retaining the values of one or more processed tokens for the processing of subsequent tokens. The long short-term memory neural network may be a neural network configured with feedback architecture. As such, the long short-term memory neural network may include one or more feedback connections that form at least one directed cycle. This feedback architecture enables the long short-term memory neural network to learn from previous inputs even when there are long time lags between two or more significant inputs.

The long short-term memory neural network may include a first long short-term memory layer and a second long short-term memory layer. The first long short-term memory layer may be configured to process a sequence of tokens (which may be in one or more training instruction sequences) while the second long short-term memory layer may be configured to process the same sequence of tokens in an opposite order. By processing the sequence of tokens in both a forward and the opposite, or reverse, order, the long short-term memory neural network may be trained to detect interdependencies in the tokens that exist in both directions. For example, processing the sequence of tokens in the opposite or reverse order may identify statements that are inside one or more loops created by, for example, while, for, and/or the like. Processing the sequence of tokens in only in the forward direction may fail to identify statements that are inside loops.

In some example embodiments, tokens input into the long short-term memory neural network may be converted into individual vectors by at least encoding the tokens using one or more encoding techniques. For example, a token may be encoded using one-hot encoding, word2vec, and/or the like. Applying one-hot encoding to encode a token may generate a vector representation of the token that corresponds to a ranking of that token relative to other tokens in the training instruction sequences. The ranking of the token may correspond to a frequency at which the token appears in the training instruction sequences. Alternately or additionally, a token may be encoded using word2vec, which may generate a vector representation of the token that corresponds to a context in which the token appears in the training instruction sequences. Representing tokens in this manner may detect and preserve similarities between different tokens. Accordingly, similar tokens may be represented by similar vectors (e.g., that tend to cluster together in a vector space).

In some example embodiments, an instruction sequence may be classified using a recursive neural tensor network. While a long short-term memory neural network may be able to detect linear or sequential interdependencies amongst the tokens in the instruction sequence, a trained recursive neural tensor network may be able to recognize more structurally complex interdependencies including, for example, repetitive and/or recursive interdependencies. Thus, the instruction sequence may be classified using a recursive neural tensor network instead of or in addition to a long short-term memory neural network. Classifying an instruction sequence using a recursive neural tensor network may include generating an abstract syntax tree (AST) representation of the tokens in the instruction sequence. The abstract syntax tree representation of the instruction sequence may preserve the structure of the instruction sequence including, for example, one or more rules for combining the tokens in the instruction sequence. The recursive neural tensor network (RNTN) may be trained to classify instruction sequences by at least using the recursive neural tensor network to process the abstract syntax tree representations of one or more training instruction sequences. A trained recursive neural tensor network may be used to classify one or more actual input instruction sequences.

FIG. 1A depicts a long short-term memory neural network 100, in accordance with some example embodiments. The operations of the long short-term memory neural network 100 may be performed in separate stages that correspond to the individual layers. Referring to FIG. 1A, the long short-term memory neural network 100 may include an embedding layer 110, a first long short-term memory layer 122, a second long short-term memory layer 124, a dropout layer 130, a fully connected layer 140, and an activation layer 150. One or more operations may be performed at each of the embedding layer 110, the first long short-term memory layer 122, the second long short-term memory layer 124, the dropout layer 130, the fully connected layer 140, and the activation layer 150 in order to process and classify an instruction sequence.

In some example embodiments, the long short-term memory neural network 100 may receive, at an input 102, a plurality of instruction sequences and provide a corresponding classification of the instruction sequences (e.g., as malicious or benign) at an output 104.

The embedding layer 110 may be configured to encode each token in the instruction sequences received at the input 102 using one or more encoding techniques. Encoding the vectors may generate vectors representations of the individual tokens in the instruction sequences received at the input 102. That is, if the plurality of instruction sequences contains a sequence of n tokens $(T_1, T_2, \ldots T_n)$, the embedding layer 110 may be configured to generate a corresponding sequence of n vectors $(v_1, v_2, \ldots v_n)$. For example, the long short-term memory neural network 100 may receive the instruction sequence var a=b. The embedding layer 110 can be configured to apply one or more encoding techniques to encode each token including, for example, the token var, the token a, the token=, and the token b.

In some example embodiments, the embedding layer 110 may use one-hot encoding to generate vector representations of the tokens in the plurality of instruction sequences received at the input 102. Using one-hot encoding to encode the tokens may generate vectors that correspond to a ranking of individual tokens in the instruction sequences received at the input 102. For instance, each of the n tokens $(T_1, T_2, \ldots T_n)$ may be encoded using one-hot encoding to generate a corresponding set of n vectors $(v_1, v_2, \ldots v_n)$ that all have a same dimension n.

The embedding layer 110 may rank the n tokens based on a frequency at which each token appears (e.g., within the plurality of training instruction sequences). Thus, the vector $v_1$ representing the $r^{th}$ most frequently occurring token may have the value of the $r^{th}$ element in the vector set to 1 while the values of the remaining elements in the vector may be set to 0. For instance, the vector [0, 0, 0, 0, 1, . . . , 0, 0, 0] may represent the $5^{th}$ most frequently occurring token.

Alternately or additionally, the embedding layer 110 may use word2vec to encode the n tokens $(T_1, T_2, \ldots T_n)$ and generate vector representations of the tokens. Using word2vec to encode the n tokens $(T_1, T_2, \ldots T_n)$ may generate vectors that correspond to a context in which each token appears in the plurality of training instruction sequences. The context of a token may correspond to one or more other tokens that may accompany that token in the plurality of training instruction sequences. Thus, two similar tokens may appear with approximately the same probability or frequency in a same or similar context (e.g., alongside a same or similar group of tokens). According to some example embodiments, using word2vec may include maximizing the following objective function J(θ) in order to generate vector representations that preserve similarities between tokens:

$$J(\theta) = \frac{1}{T}\sum_{t=1}^{T}\sum_{-c \leq j \leq c, j \neq 0} \log p(w_{t+j} | w_t),$$

wherein $p(w_{t+j}|w_t)$ is:

$$p(w_{t+j} | w_t) = \frac{\exp(v'^T_{w_{t+j}} v_{w_t})}{\sum_{w=1}^{W} \exp(v'^T_{w} v_{w_t})},$$

wherein W may be a size of the vocabulary (e.g., distinct tokens) in the plurality of training instruction sequences.

By recognizing the context of each token, the embedding layer 110 may generate similar vectors for different tokens that have the same or similar functions. For example, when the tokens in the instruction sequences are encoded using word2vec, the embedding layer 110 may generate similar vectors for the token "while" and for the token "for." In this example, the different tokens "while" and "for" may be encoded so that they have the same or similar vectors since both tokens produce a loop in the instruction sequence.

In some example embodiments, encoding the n tokens $(T_1, T_2, \ldots T_n)$ using word2vec may enable the long short-term memory neural network 100 to recognize interdependencies that may exist amongst the similar tokens. When word2vec is applied at the embedding layer 110, the long short-term memory neural network 100 may operate on similar vectors for similar tokens that appear in an instruction sequence. For example, the long short-term memory neural network 100 may process one instruction sequence containing the tokens A and B. The long short-term memory neural network 100 may also process a different instruction sequence containing the tokens A' and B'. The token A may be similar to the token A' while the token B may be similar to the token B'. Thus, the embedding layer 110 may apply word2vec to generate similar vectors for the tokens A and A' and similar vectors for the tokens B and B'. If the long short-term memory neural network 100 detects an interdependency between the tokens A and B, the long short-term memory neural network 100 may also detect a similar interdependency between the tokens A' and B'. Accordingly, the long short-term memory neural network 100 may generate the same or similar classifications for the instruction sequence containing the tokens A and B and for the instruction sequence containing the tokens A' and B'.

To further illustrate, the long short-term memory neural network 100 may operate on similar vectors when the long short-term memory neural network 100 processes the token "while" and when the long short-term memory neural network 100 processes the token "for." Thus, the long short-term memory neural network 100 may be able to detect interdependencies with respect to the token "while." Moreover, the long short-term memory neural network 100 may also be able to detect the same interdependencies with respect to the similar token "for." As such, the long short-term memory neural network 100 may generate the same or similar classifications for an instruction sequence containing the token "while" and for an instruction sequence containing the token "for."

Figure 4:
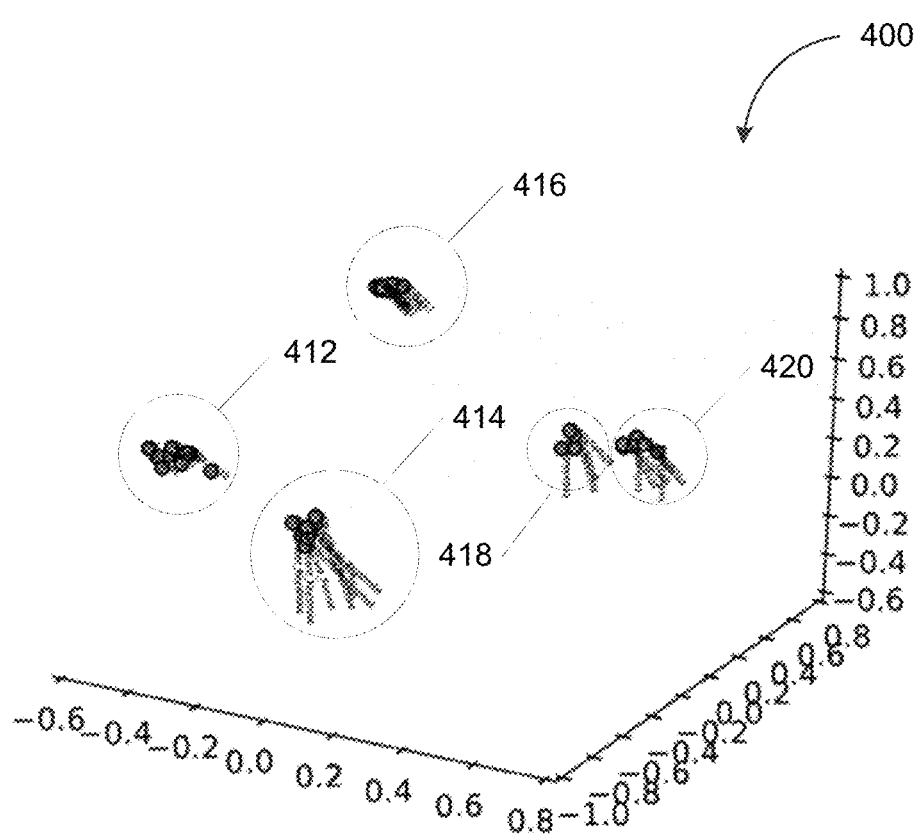
FIG. 4 depicts a vector space illustrating a clustering of vectors representative of a plurality of tokens, in accordance with some example embodiments.

FIG. 4 depicts a vector space 400 illustrating a clustering of vectors representative of a plurality of tokens, in accordance with some example embodiments. As shown in FIG. 4, the embedding layer 110 may encode a plurality of tokens in a manner that detects and preserves the similarities between tokens, as noted in the "for" and "while" example above. For instance, using word2vec may generate similar vectors for different tokens that have the same or similar function. The resulting vectors may, due to their similarities, cluster together in the vector space 400.

Referring to FIG. 4, the vector space 400 includes a plurality of clusters including, for example, a first cluster 412, a second cluster 414, a third cluster 416, a fourth cluster 418, and a fifth cluster 420. Each of the first cluster 412, the second cluster 414, the third cluster 416, the fourth cluster 418, and the fifth cluster 420 may include vector representations of tokens such as, for example, the token "while" and for the token "for" that have the same or similar functions.

In some example embodiments, the first long short-term memory layer 122 may be configured to process the vector representations of a corresponding sequence of tokens from the embedding layer 110. The first long short-term memory layer 122 may process the tokens sequentially. For example, the first long short-term memory layer 122 may process a sequence of n vectors $(v_1, v_2, \ldots v_n)$ corresponding to a sequence of n tokens $(T_1, T_2, \ldots T_n)$. The long short-term memory layer 122 may process the vector representations sequentially by at least processing the vectors one by one starting at the vector $v_1$ and ending at the vector $v_n$.

Information from previous tokens processed by the first long short-term memory layer 122 may be selectively accumulated, retained, and/or passed onto subsequent processing stages when the first long short-term memory layer 122 processes additional tokens in the sequence. According to some example embodiments, information from previous tokens processed by the first long short-term memory layer 122 may further be selectively passed onto subsequent long short-term memory layers including, for example, the second long short-term memory layer 124. The second long short-term memory layer 124 may process information from the first long short-term memory layer 122 and may selectively accumulate, retain, and pass information onto subsequent processing stages when the second long short-term memory layer 124 processes additional information from the first long short-term memory layer 122.

Because the first long short-term memory layer 122 and the second long short-term memory layer 124 both have memory to retain at least some of the information that was processed by the first long short-term memory layer 122 and the second long short-term memory layer 124, the first long short-term memory layer 122 and the second long short-term memory layer 124 may be trained to recognize interdependencies amongst the tokens in an instruction sequence. The interdependencies amongst the tokens in the instruction sequence may include a presence of a certain token in the instruction sequence subsequent to one or more other specific tokens. These interdependencies may indicate that the instruction sequence exhibits particular (e.g., malicious) function or behavior. For example, the first long short-term memory layer 122 may retain a first token while it continues to process one or more additional tokens. When the first long short-term memory layer 122 subsequently encounters a second token, the first long short-term memory layer 122 may be able to recognize an interdependency between the first token and the second token.

Although the long short-term memory neural network 100 is shown to include the first long short-term memory layer 122 and the second long short-term memory layer 124, it should be appreciated that the long short-term memory neural network 100 may include a different number of long short-term memory layers than shown without departing from the scope of the present disclosure. For instance, each additional long short-term memory layer may be configured to further selectively process, accumulate, and/or pass on information received from previous long short-term memory layers.

The dropout layer 130 may be configured to remove (e.g., drop out) at least some of the output from the second long short-term memory layer 124. The operations of one or more preceding long short-term memory layers (e.g., the first long short-term memory layer 122 and/or the second long short-term memory layer 124) may introduce sampling noise, which may cause overfitting at the subsequent fully connected layer 140. As such, the dropout layer 130 may prevent overfitting by omitting at least some of the outputs from the second long short-term memory layer 124 in accordance with a certain probability p. For instance, outputs from the second long short-term memory layer 124 may be dropped out a p proportion of the time and may be passed onto the fully connected layer 140 the remaining (1-p) proportion of the time.

In some example embodiments, the outputs from the dropout layer 130 may be passed onto the fully connected layer 140, which may be configured to perform one or more high level processing operations across the full set of output from the dropout layer 130. Meanwhile, the activation layer 150 may apply one or more activation functions to the output from the fully connected layer 140 to generate the output 104, which may be a classification of an instruction sequence as malicious or benign. For example, the activation layer 150 may apply the following Softmax activation function:

$$P(y=j|x) = \frac{e^{x^T w_j}}{\sum_{k=1}^{K} e^{x^T w_k}}$$

Figure 1B:
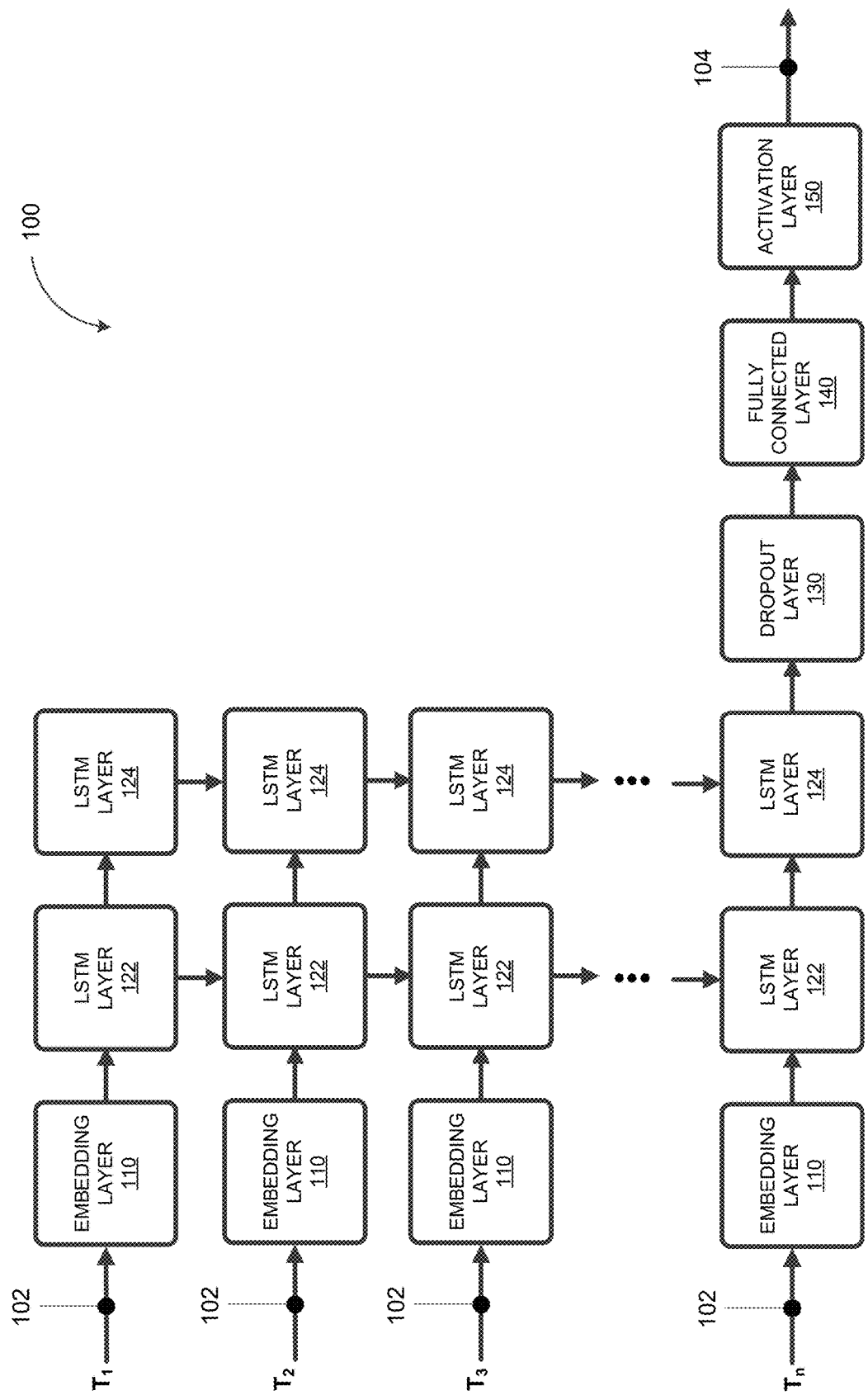
FIG. 1B depicts a plurality of processing stages of a long short-term memory neural network, in accordance with some example embodiments.

FIG. 1B depicts a plurality of processing stages of long short-term memory neural network 100, in accordance with some example embodiments. Referring to FIGS. 1A-B, the long short-term memory neural network 100 may receive, at the input 102, a plurality of instruction sequences that include a sequence of n tokens ($T_1$, $T_2$, ... $T_n$). As shown in FIG. 1B, the long short-term memory neural network 100 may be unfolded to show the successive stages of processing the sequence of n tokens ($T_1$, $T_2$, ... $T_n$).

Referring to FIG. 1B for example, the long short-term memory neural network 100 may receive a token $T_1$. The embedding layer 110 may generate a vector representation of the token $T_1$ while the first long short-term memory layer 122 may process the vector representation of the token $T_1$. In some example embodiments, the first long short-term memory layer 122 may be configured to selectively retain and/or pass on information from processing the token $T_1$. For instance, the first long short-term memory layer 122 may process the vector representation associated with the token $T_1$ and determine whether to retain and/or pass on at least a portion of the resulting information to a next processing stage at the first long short-term memory layer 122 (e.g., for a next token $T_2$) and/or to a next long short-term memory layer including, for example, the second long short-term memory layer 124. As such, the first long short-term memory layer 122 may (or may not) utilize at least some of the information associated with the token $T_1$ when the first long short-term memory layer 120 processes the next token $T_2$ in the sequence of tokens. Similarly, the second long short-term memory layer 122 may (or may not) process further process at least some of the information from the processing of the token $T_1$ by the first long short-term memory layer 122.

Referring again to FIG. 1B, the first long short-term memory layer 122 may process the token $T_2$, and selectively retain and/or pass on at least a portion of the resulting information to a next processing stage at the first long short-term memory layer 122 (e.g., for a next token $T_3$). In this manner, the first long short-term memory layer 122 may utilize information associated with the token $T_1$ and/or the $T_2$ when the first long short-term memory layer 122 is processing the token $T_3$. In some example embodiments, the first long short-term memory layer 122 may further selectively pass on information from the processing of the token $T_2$ to a next long short-term memory layer including, for example, the second long short-term memory layer 124. As such, the second long short-term memory layer 124 may further process and aggregate information derived from the processing of the token $T_1$ and/or the token $T_2$.

The first long short-term memory layer 122 may apply one or more weights in processing each token in the sequence of n tokens ($T_1$, $T_2$, ... $T_n$). Similarly, the second long short-term memory layer 124 may also apply one or more weights in further processing and aggregating information from the first long short-term memory layer 122. According to some example embodiments, training the long short-term memory neural network 100 may include using the long short-term memory neural network 100 to process a plurality of training instruction sequences. Training the long short-term memory neural network 100 may further include applying supervised learning and/or optimization techniques to adjust the weights to minimize an error or loss in the output 104 from the long short-term memory neural network 100.

Figure 2A:
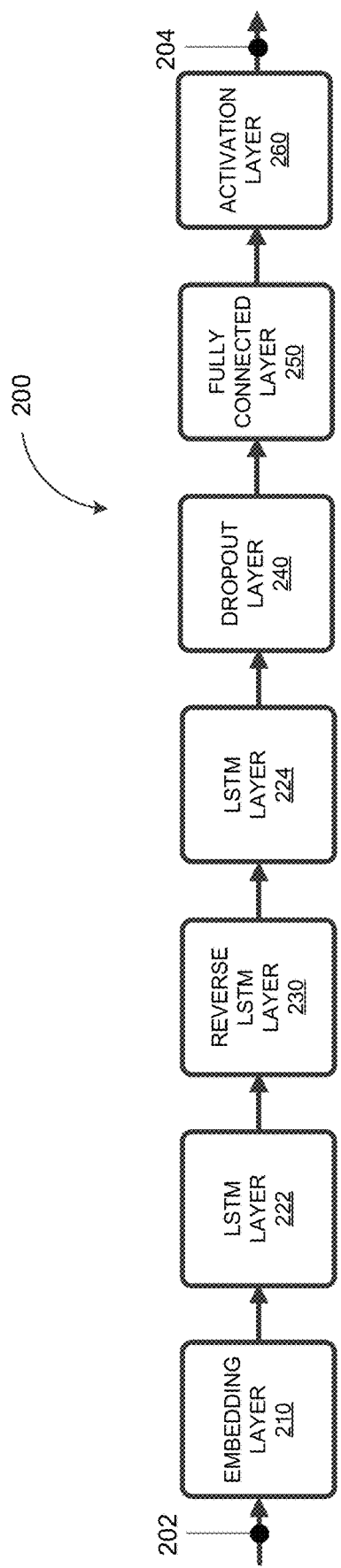
FIG. 2A depicts a long short-term memory neural network, in accordance with some example embodiments.

FIG. 2A depicts a long short-term memory neural network 200, in accordance with some example embodiments. Referring to FIG. 2A, the long short-term memory neural network 200 may include an embedding layer 210, a first long short-term memory layer 222, a reverse long short-term memory Layer 230, a second long short-term memory layer 224, a dropout layer 240, a fully connected layer 250, and an activation layer 260. In some example embodiments, the long short-term memory neural network 200 may receive a plurality of instruction sequences at an input 202 and provide a corresponding classification of the instruction sequences, such as whether the instruction sequence is malicious or benign, at an output 204.

In some example embodiments, the embedding layer 210 may be configured to generate vector representations of tokens received at the input 202. For instance, the long short-term memory neural network 200 may receive the instruction sequence var a=b. The embedding layer 210 may generate vector representation for each token including, for example, the token var, the token a, the token=, and the token b. The embedding layer may use a variety of encoding techniques, such as one-hot encoding, word2vec, and/or the like, to generate the vector representation.

According to some example embodiments, the long short-term memory neural network 200 may include at least one reverse long short-term memory layer including, for example, the reverse long short-term memory layer 230. The reverse long short-term memory layer 230 may be coupled with one or more other long short-term memory layers including, for example, the first long short-term memory layer 222 and the second long short-term memory layer 224.

The reverse long short-term memory layer 230 may be configured to process a sequence of tokens in an opposite direction as the first long short-term memory layer 222 and/or the second long short-term memory layer 224. For instance, the first long short-term memory layer 222 and/or the second long short-term memory layer 224 may process the sequence of n tokens ($T_1, T_2, T_n$) in a forward order starting from the first token $T_1$ and ending at the last token $T_n$. By contrast, the reverse long short-term memory layer 230 may process the sequence of n tokens ($T_1, T_2, T_n$) in a reverse order starting from the last token $T_n$ and ending at the first token $T_1$.

Processing a sequence of tokens in both a forward and reverse direction may identify interdependencies in both directions. For example, the instruction sequence shown in Table 1 may contain a while loop as shown in Table 1 below:

TABLE 1

```
var text = " ";
var i = 0;
do {
    text += "The number is" + i;
    i++;
}
while (i < 5);
```

Processing the instruction sequence shown in Table 1, for example, in only a forward direction may not identify the statements "text+="The number is"+i" and "i++" as being inside the while loop. Thus, in order to identify the elements of the while loop, the long short-term memory neural network 200 may process the instruction sequence in both a forward and a reverse direction.

The first long short-term memory layer 222 may apply one or more weights in processing each token in the sequence of n tokens ($T_1, T_2, \ldots T_n$). Similarly, the reverse long short-term memory layer 230 and the second long short-term memory layer 224 may also apply one or more weights in further processing and aggregating information from one or more previous long short-term memory layers. According to some example embodiments, training the long short-term memory neural network 200 may include using the long short-term memory neural network 200 to process a plurality of training instruction sequences. Training the long short-term memory neural network 200 may further include applying one or more supervised learning (e.g., backwards propagation of errors) and optimization techniques (e.g., gradient descent) to adjust the weights to minimize an error or loss in the output 204 from the long short-term memory neural network 200.

The dropout layer 240 may be configured to remove (e.g., drop out) at least some of the output from the second long short-term memory layer 224. The operations of one or more preceding long short-term memory layers (e.g., the first long short-term memory layer 222, the second long short-term memory layer 224, and/or the reverse long short-term memory layer 230) may introduce sampling noise, which may cause overfitting at the subsequent fully connected layer 140. As such, the dropout layer 240 may prevent overfitting by omitting at least some of the outputs from the second long short-term memory layer 224 in accordance with a certain probability p. For instance, outputs from the second long short-term memory layer 224 may be dropped out a p proportion of the time and may be passed onto the fully connected layer 250 the remaining (1-p) proportion of the time.

In some example embodiments, the outputs from the dropout layer 240 may be passed onto the fully connected layer 250, which may be configured to further process the outputs from the dropout layer 240 including by computing a classification or score for each output from the dropout layer 240. The fully connected layer 250 may be configured to relate multiple outputs from the dropout layer 240 to a single output to be processed by the activation layer 260. Meanwhile, the activation layer 260 may apply one or more activation functions (e.g., Softmax) to the output from the fully connected layer 250 to generate the output 204, which may be a classification of an instruction sequence as malicious or benign.

Figure 2B:
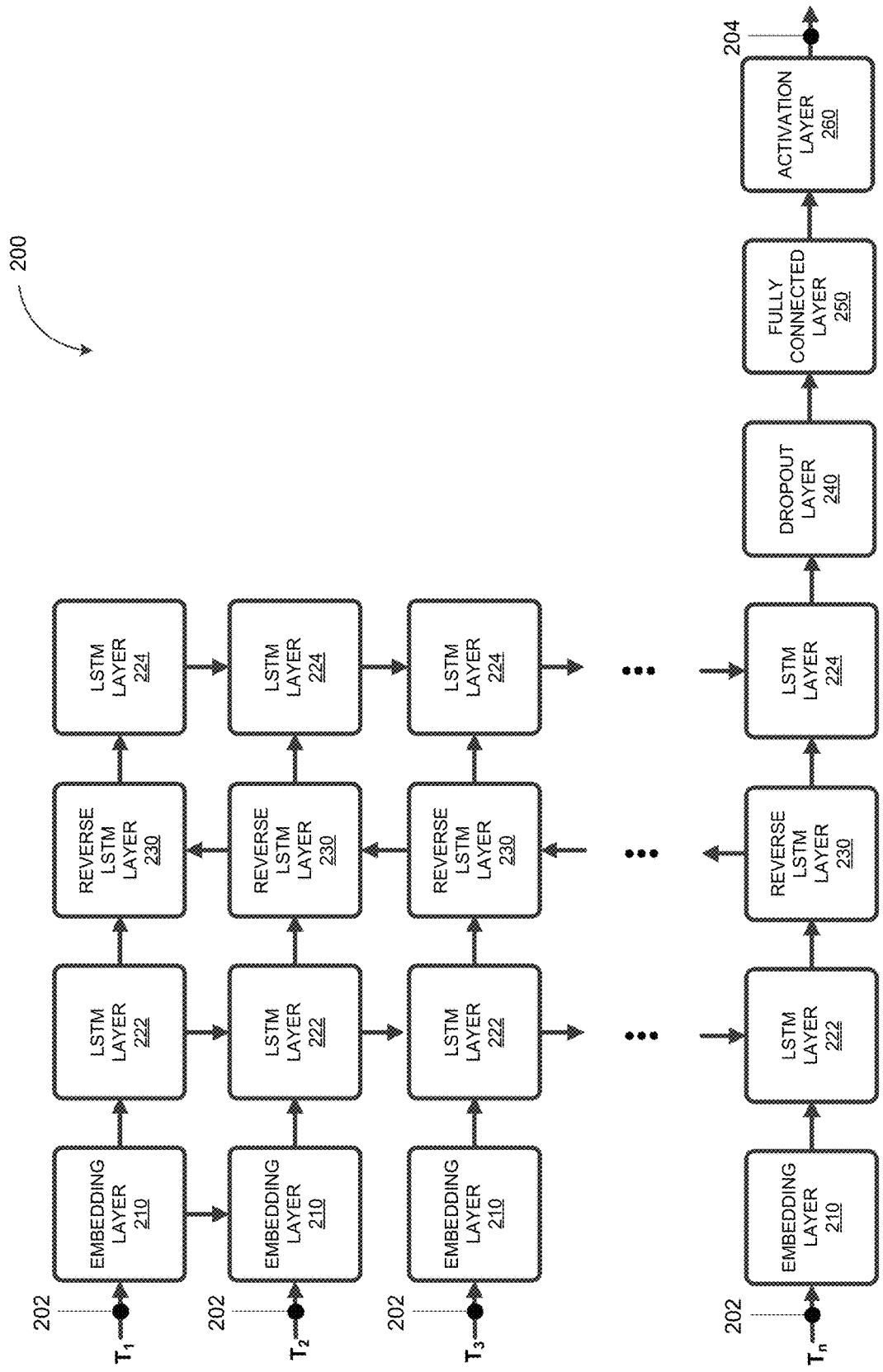
FIG. 2B depicts a plurality of processing stages of a long short-term memory neural network, in accordance with some example embodiments.

FIG. 2B depicts a plurality of processing stages of the long short-term memory neural network 200, in accordance with some example embodiments. As shown in FIG. 2B, the first long short-term memory layer 222 may process the sequence of n tokens ($T_1, T_2, \ldots T_n$) in a forward direction starting from the first token $T_1$ and ending at the last token $T_n$. The first long short-term memory layer 222 may selectively retain and/or pass on at least a portion of the information from processing a token to a next processing stage at the first long short-term memory layer 222 where a next token is processed by the first long short-term memory layer 222. Meanwhile, the reverse long short-term memory layer 230 may process the sequence of n tokens ($T_1, T_2, \ldots T_n$) in a reverse direction starting from the last token $T_n$ and ending at the first token $T_1$. For instance, information from the processing of the first token $T_1$ (e.g., by the first long short-term memory layer 222) may be selectively passed onto the reverse Long short-term memory layer 230 where the information may be selectively aggregated with information from the processing of one or more of the subsequent tokens $T_2$ through $T_n$ (e.g., by the reverse long short-term memory layer 230). In this manner, the long short-term memory neural network 200 may identify both forward and backward interdependencies amongst the sequence of n tokens ($T_1, T_2, \ldots T_n$).

Figure 3:
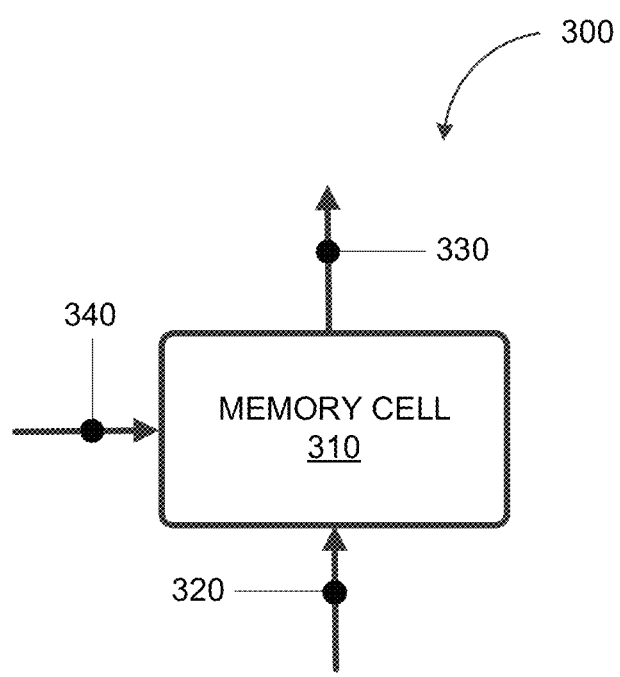
FIG. 3 depicts a long short-term memory block, in accordance with some example embodiments.

FIG. 3 depicts a long short-term memory block 300, in accordance with some example embodiments. The long short-term memory block 300 may be a component of a long short-term memory neural network. For example, referring to FIGS. 1A-3, the long short-term memory block 300 may provide the functionalities of the first long short-term memory layer 122 and/or the second long short-term memory layer 124 of the long short-term memory neural network 100. Alternately or additionally, the long short-term memory block 300 may provide the functionalities of the first long short-term memory layer 222, the reverse long short-term memory layer 230, and/or the second long short-term memory layer 224 of the long short-term memory neural network 200. As shown in FIG. 3, the long short-term memory block 300 may include a memory cell 310 coupled with an input gate 320, an output gate 330, and a forget gate 340.

In some example embodiments, a state c of the long short-term memory block 300 may be controlled by the input gate 320, the output gate 330, and/or the forget gate 340. The long short-term memory block 300 may further be associated with a hidden state h, which has a value corresponding to the one or more tokens encountered by the long short-term memory block 300. The value of the hidden state h may be carried forward as the long short-term memory block 300 continues to process subsequent tokens. Thus, the hidden state h may provide the memory associated with the long short-term memory block. Meanwhile, the input gate 320, the output gate 330, and/or the forget gate 340 may each apply an activation function, such as a hard sigmoid function and/or other type of function, to determine a portion of information that should be added to, removed, and/or output from the memory cell 310.

For example, the memory cell 310 may receive, at time t, a token $x_t$. The forget gate 340 may determine whether to remove at least a portion of a value of the state c of the memory cell 310 by applying the activation function σ to the token $x_t$ and the value of the previous hidden state $h_{t-1}$. The memory cell 310 may have retained the value of the hidden state $h_{t-1}$ when the long short-term memory block 300 processed a token $x_{t-1}$ received at an earlier time t−1. It should be appreciated that the value of the hidden state $h_{t-1}$ may correspond to a plurality of tokens from 1 to t−1 that has been processed by the long short-term memory block 300. A portion of information $f_t$ that may be removed from the state c of the memory cell 310 at time t may be given by the following:

$$f_t = \sigma(x_f + h_{t-1} \cdot U_f),$$

wherein $x_f = x_t \cdot W_f + b_f$, wherein · denotes an inner product, and wherein $U_f$, $W_f$, and $b_f$ are the weights applied at the forget gate 340.

Meanwhile, the input gate 320 may determine whether to store at least a portion of the current input, token $x_t$, in the memory cell 310 by applying the activation function σ to the token $x_t$ and the value of the hidden state $h_{t-1}$. Storing at least a portion of the current input, token $x_t$, may alter the value of the state c of the long short-term memory block 300. A portion of the information $i_t$ that may be stored to the memory cell 310 may be given by the following:

$$i_t = \sigma(x_i + h_{t-1} \cdot U_i),$$

wherein $x_i = x_t \cdot W_i + b_i$, wherein · denotes an inner product, and wherein $U_i$, $W_i$, and $b_i$ are the weights applied at the input gate 320.

The output gate 330 may determine a portion of the hidden state $h_{t-1}$ that should be output by the long short-term memory block 300. In some example embodiments, the output gate 330 may determine the portion of the hidden state $h_{t-1}$ to output by applying the activation function σ to the token $x_t$ and the value of the hidden state $h_{t-1}$. In some example embodiments, an output $o_t$ of the long short-term memory block 300 at time t may be given by the following:

$$o_t = \sigma(x_0 + h_{t-1} \cdot U_o),$$

wherein $x_o = x_t \cdot W_o + b_o$, wherein · denotes an inner product, and wherein $U_o$, $W_o$, and $b_o$ are the weights applied at the output gate 330.

In some example embodiments, the addition and/or removal of information from the memory cell 310 may alter the state c of the long short-term memory block 300. The state $c_t$ of the long short-term memory block 300 at time t may be given by the following:

$$c_t = f_t \odot c_{t-1} + i \odot \eta(x_c + h_{t-1} \cdot U_c),$$

wherein $x_c = x_t \cdot W_c + b_c$, wherein η denotes a activation function (e.g., hyperbolic tangent function (tan h)), wherein · denotes an inner product, wherein ⊙ denotes elementwise multiplication, and wherein $U_c$, $W_c$, and $b_c$ are the weights applied to determine the state c of the long short-term memory block 300.

In some example embodiments, the additional and/or removal of information from the memory cell 310 may change the hidden state h stored in the memory cell 310. It should be appreciated that the long short-term memory block 300 may output the hidden state $h_t$ at time t. For instance, the first long short-term memory layer 122 may output, to the second long short-term memory layer 124, the hidden state $h_t$ of the long short-term memory block 300. The hidden state $h_t$ stored in the memory cell 310 at time t may be given by the following:

$$h_t = o_t \odot \eta(c_t),$$

wherein $o_t$ denotes the output of from the long short-term memory block 300 at time t, wherein $c_t$ denotes the state of the long short-term memory block 300 at time t, wherein ⊙ denotes elementwise multiplication, and wherein η refers to an activation function (e.g., hyperbolic tangent function (tan h)).

Figure 5:
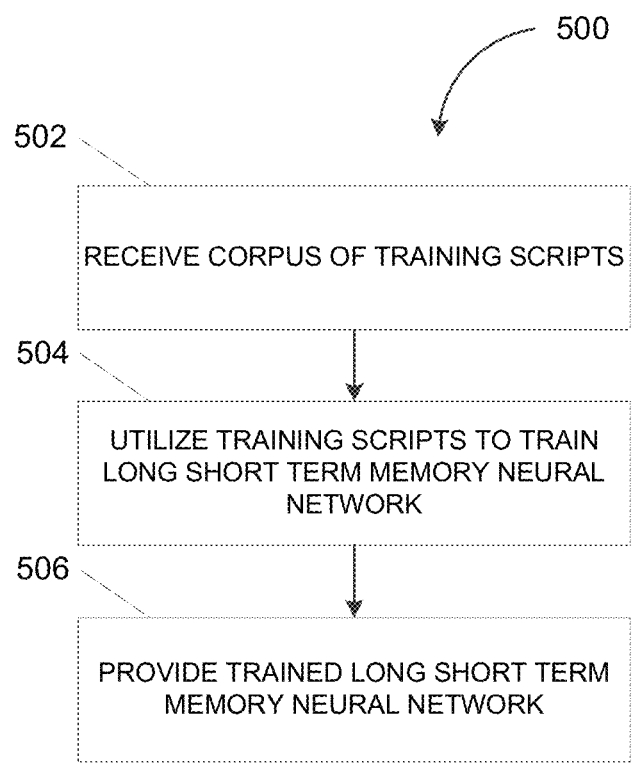
FIG. 5 depicts a flowchart illustrating a process for training a long short-term memory neural network, in accordance with some example embodiments.

FIG. 5 depicts a flowchart illustrating a process 500 for training a long short-term memory neural network, in accordance with some example embodiments. Referring to FIGS. 1-3 and 5, the process 500 may be performed by a long short-term memory neural network including, for example, the long short-term memory neural network 100 and/or the long short-term memory neural network 200.

A long short-term memory neural network may receive a plurality of training instruction sequences (502). For example, the long short-term memory neural network 100 may receive training instruction sequences that include tokens having one or more predetermined interdependencies. Thus, in some example embodiments, each of the plurality of training instruction sequences may be accompanied by a correct classification, such as whether a training instruction sequence is malicious or benign.

The long short-term memory neural network may be trained by at least processing the plurality of training instruction sequences with the long short-term memory neural network (504). For example, the long short-term memory neural network 100 may be trained by at least using the long short-term memory neural network to process the plurality of training instruction sequences. In some example embodiments, the long short-term memory neural network 100 may be adapted to process a vector representation (e.g., one-hot encoding, word2vec) of the tokens in the training instruction sequences.

For each training instruction sequence, an error may be calculated. The error may reflect whether the long short-term memory neural network 100 is able to correctly detect the predetermined interdependencies within each training instruction sequence. The calculated error may be back propagated through the long short-term memory neural network 100 to generate a loss function. Gradient descent may be performed in order to determine one or more optimizations to the long short-term memory neural network 100 (e.g., the weights U, W, and b applied at the long short-term memory layers) that would minimize the loss function. In some example embodiments, training the long short-term memory neural network 100 may include processing a plurality of training instruction sequences with the long short-term memory neural network 100. As such, multiple iterations of optimizations (e.g., weight adjustments) may be performed in order to train the long short-term memory neural network 100.

A trained long short-term memory neural network may be provided to classify one or more instruction sequences (506). For example, a trained long short-term memory neural network 100 may be deployed to process actual input instruction sequences and provide a classification of the instruction sequences (e.g., as malicious or benign). In some example embodiments, the trained long short-term memory neural network 100 may be provided in any manner including computer software, dedicated circuitry (e.g., application specific integrated circuits (ASICs)), and/or over a cloud platform.

In some example embodiments, a trained long short-term memory neural network may be updated by at least training the trained long short-term memory neural network with additional training instruction sequences. The additional training instruction sequences may include different predetermined interdependencies that the long short-term memory neural network was not initially trained to detect. An updated version of the trained long short-term memory neural network may be again deployed as computer software, dedicated circuitry (e.g., application specific integrated circuits (ASICs)), and/or over a cloud platform. Alternately or additionally, the trained long short-term memory neural network may serve as the basis for a different (e.g., customized) long short-term memory neural network that is trained specifically to recognize certain interdependencies in instruction sequences. As such, one or more separate long short-term memory neural networks may be generated by training the trained long short-term memory neural networks with additional training instruction sequences.

Figure 6:
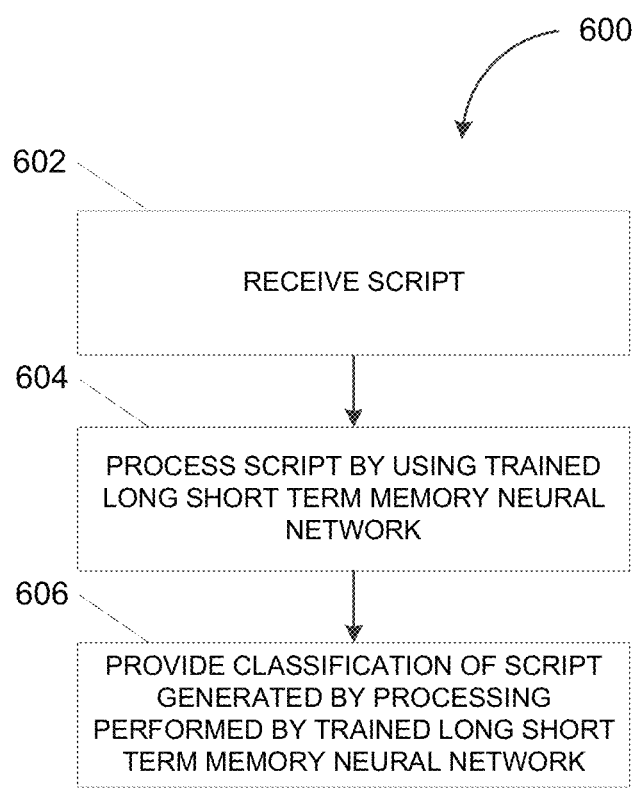
FIG. 6 depicts a flowchart illustrating a process for training a recursive neural tensor network, in accordance with some example embodiments.

FIG. 6 depicts a flowchart illustrating a process 600 for utilizing a trained long short-term memory neural network, in accordance with some example embodiments. Referring to FIGS. 1-3 and 6, in some example embodiments, the process 600 may be performed by the long short-term memory neural network 100 and/or the long short-term memory neural network 200 subsequent to training.

A trained long short-term memory neural network may receive an instruction sequence that includes a plurality of tokens (602). For example, the long short-term memory neural network 100 may receive an instruction sequence that includes a sequence of tokens (e.g., a sequence of n tokens ($T_1, T_2, \ldots T_n$).

The long short-term memory neural network may process the instruction sequence to at least detect one or more interdependencies amongst the plurality of tokens in the instruction sequence (804). For example, the trained long short-term memory neural network 100 may process a vector representation (e.g., one-hot encoding, word2vec) of the tokens in the instruction sequence. The trained long short-term memory neural network 100 may include at least one long short-term memory layer configured to apply one or more weights that have been optimized (e.g., during training) to detect interdependencies amongst the tokens and to determine a classification for the instruction sequence with minimal error.

The long short-term memory neural network may provide, as an output, a classification of the instruction sequence (806). For example, the result of the processing performed by the trained long short-term memory neural network 100 may be a classification of the instruction sequence as malicious or benign.

In some example embodiments, an instruction sequence may be classified by processing the instruction sequence using a recursive neural tensor network. The recursive neural tensor network may be used in addition to or instead of a long short-term memory neural network. For example, a recursive neural tensor network may be used to process an abstract syntax tree representation of an instruction sequence. The abstract syntax tree representation of the instruction sequence may preserve the structural relationship between tokens appearing in the instruction sequence.

A long short-term memory neural network may be used to detect sequential interdependencies between tokens in an instruction sequence. That is, a long short-term memory neural network may be able to recognize an interdependency when the long short-term memory neural network encounters one token subsequent to another token. By contrast, processing an abstract syntax tree representation of an instruction sequence with a recursive neural tensor network may detect more structurally complex interdependencies between tokens in the instruction sequence.

For example, consider the instruction sequence "x=a+d*(b+c)." In this instruction sequence, the interdependency between the tokens "b," "c," and "d" may not be merely sequential (i.e., that the token "c" appears after the token "b" and the token "b" appears after the token "d"). Instead, the token "b" may be first added to the token "c" before being multiple by the token "d." A recursive neural tensor network may be able to detect more structurally complex interdependencies such as the one depicted in this example.

Figure 7:
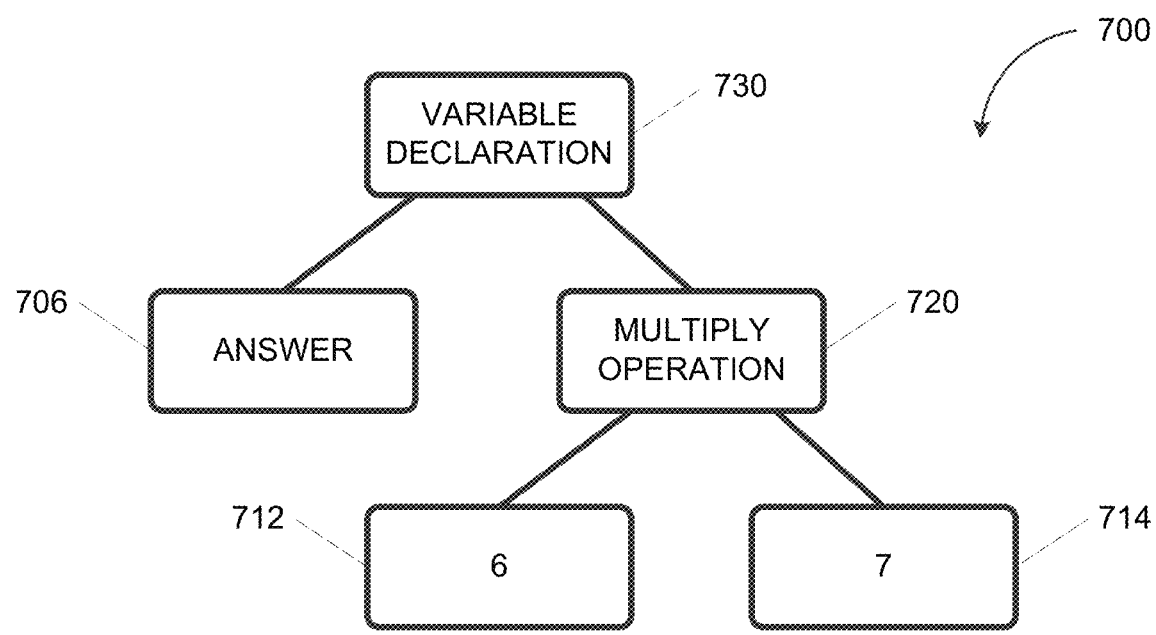
FIG. 7 depicts an abstract syntax tree, in accordance with some example embodiments.

FIG. 7 depicts an abstract syntax tree 700, in accordance with some example embodiments. Referring to FIG. 7, the abstract syntax tree 700 may represent an instruction sequence by at least representing the tokens within the instruction sequence and the one or more rules for combining the tokens. The abstract syntax tree 700 may be generated for an instruction sequence in order for the instruction sequence to be processed and classified by a recursive neural tensor network. As shown in FIG. 5, the abstract syntax tree 500 may represent the instruction sequence "var answer=6*7." One or more tokens from the instruction sequence may occupy the leaf nodes of the abstract syntax tree 500. For instance, the token "6" may occupy a first leaf node 712, the token "7" may occupy a second leaf node 714, and the token "answer" may occupy a third leaf node 716.

One or more tokens in the instruction sequence may indicate rules for combining other tokens in the instruction sequence. These tokens may occupy the parent nodes of the abstract syntax tree 700. For example, the rule for combining the token "6" and the token "7" is the multiplication operation "*." As such, the multiplication operation "*" may occupy a first parent node 720 of the first leaf node 712 and the second leaf node 714. Meanwhile, the variable declaration "var" may occupy a second parent node 730 of the third leaf node 716 and the first parent node 720. The variable declaration "var" may indicate the rule for combining the token "*" and the token "answer."

In some example embodiments, a recursive neural tensor network may process and classify an instruction sequence by at least recursively assigning weights to the nodes in the abstract syntax tree 700 and/or tensors to the connections between the nodes in the abstract syntax tree 700. The recursive neural tensor network may start by assigning weights to the leaf nodes of the abstract syntax tree 700 and tensors to the connections between the leaf nodes to the corresponding parent nodes. The recursive neural tensor network may continue to assign weights and tensors to the nodes and connections in the abstract syntax tree 700 until a root node is reached. For instance, the recursive neural tensor network may assign, to each of the first leaf node 712, the second leaf node 714, and the third leaf node 716, a weight corresponding to the token contained in each of first leaf node 712, the second leaf node 714, and the third leaf node 716. Tensors may be assigned to the connections between the first parent node 720 and the first leaf node 712 and the second leaf node 714.

The weight of a parent node p (e.g., the first parent node 720) may be determined based on the weight of the corresponding children nodes $c_1$ and $c_2$ (e.g., the first leaf node 712 and the second leaf node 714) based on the following equation:

$$p = f\left(\begin{bmatrix} c_1 \\ c_2 \end{bmatrix} V \begin{bmatrix} c_1 \\ c_2 \end{bmatrix} + W \begin{bmatrix} c_1 \\ c_2 \end{bmatrix}\right),$$

wherein $c_1$ and $c_2$ correspond to the scores assigned to the children node, wherein the tensor V and the weight W connect the child nodes to the parent nodes, wherein the tensor $V \in \mathbb{R}^{2d \times 2d \times d}$, and wherein d may be a dimension of a vector representing a token.

Referring again to FIG. 7, the weight of the first parent node 720 may correspond to the respective weights and tensors associated with the first leaf node 712 and the second leaf node 714. Meanwhile, the weight of the second parent node 730 may correspond to the respective weights and tensors of the third leaf node 716 and the first parent node 720. Thus, the weight of the first parent node 720 and the second parent node 730 may reflect the weights of the respective children nodes and the tensors of the connections to the children nodes. Meanwhile, the classification of the instruction sequence may correspond to the weight associated with a root node of the abstract syntax tree 700. As shown in FIG. 5, the classification of the instruction sequence "var answer=6*7" may correspond to the weight associated with the second parent node 530. The recursive neural tensor network may classify the instruction sequence as benign when the weight associated with the root node of the abstract syntax tree 700 exceeds a threshold value. Conversely, the recursive neural tensor network may classify the instruction sequence as malicious when the weight associated with the root node of the abstract syntax tree 700 does not exceed the threshold value.

In some example embodiments, the recursive neural tensor network may be trained by processing a plurality of training instruction sequences with the recursive neural tensor network. For instance, the recursive neural tensor network may be trained by at least processing, with the recursive neural tensor network, the abstract syntax tree representations of the training instruction sequences. Training the recursive neural tensor network may further include using backpropagation to adjust the tensor V and the weight W of the children and parent nodes in an abstract syntax tree representation of a training instruction sequence (e.g., the abstract syntax tree 700) until a value at the root node corresponds to a correct classification of the training instruction sequence.

Figure 8:
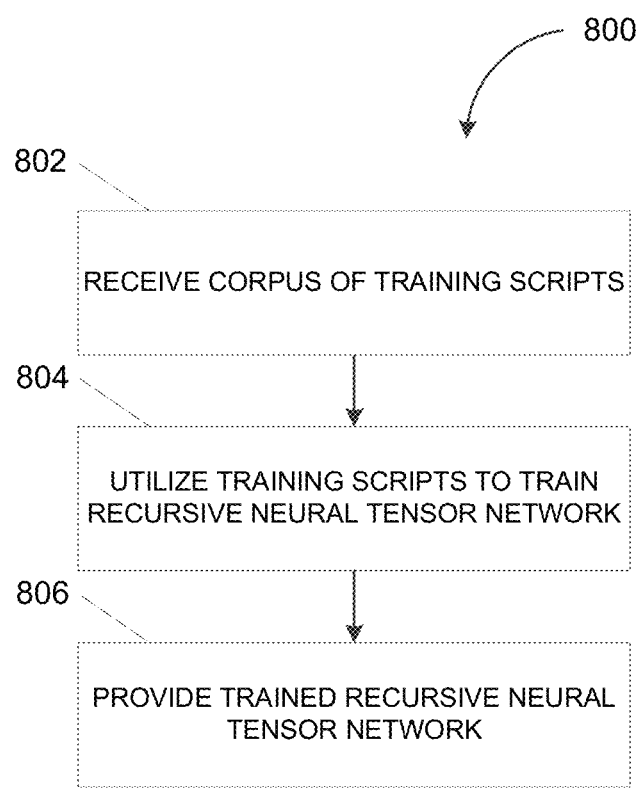
FIG. 8 depicts a flowchart illustrating a process for training a recursive neural tensor network, in accordance with some example embodiments.

FIG. 8 depicts a flowchart illustrating a process 800 for training a recursive neural tensor network, in accordance with some example embodiments. Referring to FIGS. 7 and 8, the process 800 may be performed by a recursive neural tensor network.

A recursive neural tensor network may receive a plurality of training instruction sequences (802). For example, the recursive neural tensor neural network may receive one or more training instruction sequences. In some example embodiments, the recursive neural tensor neural network may receive the abstract syntax tree representations of the one or more trainings instruction sequences.

The recursive neural tensor network may be trained by at least processing the plurality of training instruction sequences with the recursive neural tensor network (804). According to some example embodiments, the recursive neural tensor network may be adapted to process an abstract syntax tree representation of each training instruction sequence. The abstract syntax tree representation of a training instruction sequence may preserve the structure (e.g., rules for combining various tokens) present in the training instruction sequence. The recursive neural tensor network may process the training instruction sequence by at least assigning weights to each node in the abstract syntax tree representation of the training instruction sequence. The recursive neural tensor network may further assign tensors to the connections between the nodes in the abstract syntax tree representation of the training instruction sequence. The weight of a parent node may be determined based on the weight assigned to the children nodes and the tensors associated with the connections to the children nodes. Training the recursive neural tensor network may include adjusting the weights and tensors such that a weight of the root node corresponds to a correct classification of the training instruction sequence.

A train recursive neural tensor network may be provided to classify one or more instruction sequences (906). For example, a trained recursive neural tensor network may be deployed to process actual input instruction sequences and provide a classification of the instruction sequences (e.g., as malicious or benign). In some example embodiments, the trained recursive neural tensor network may be provided in any manner including computer software, dedicated circuitry (e.g., application specific integrated circuits (ASICs)), and/or over a cloud platform.

In some example embodiments, a trained recursive neural tensor network may be updated by at least training the trained recursive neural tensor network with additional training instruction sequences. The additional training instruction sequences may include different predetermined interdependencies that the recursive neural tensor network was not initially trained to correctly classify. An updated version of the trained recursive neural tensor network may be again deployed as computer software, dedicated circuitry (e.g., application specific integrated circuits (ASICs)), and/or over a cloud platform. Alternately or additionally, the trained recursive neural tensor network may serve as the basis for a different (e.g., customized) recursive neural tensor network that is trained specifically to recognize certain interdependencies in instruction sequences. As such, one or more separate recursive neural tensor networks may be generated by training the trained recursive neural tensor networks with additional training instruction sequences.

Figure 9:
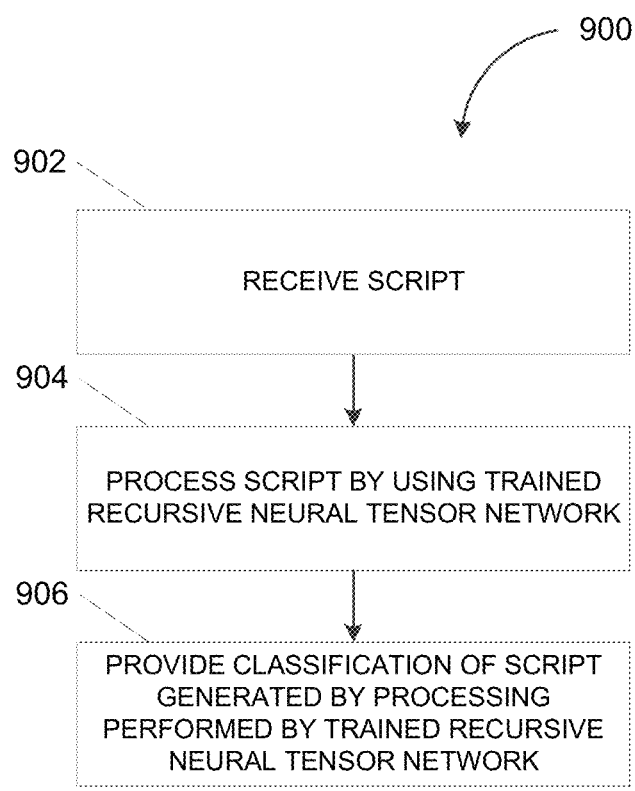
FIG. 9 depicts a block diagram illustrating a neural network system, in accordance with some example embodiments.

FIG. 9 depicts a flowchart illustrating a process 900 for utilizing a trained recursive neural tensor network, in accordance with some example embodiments. Referring to FIGS. 7 and 9, in some example embodiments, the process 900 may be performed by a recursive neural tensor network that has been subject to training.

A recursive neural tensor network may receive an instruction sequence (902). For example, the recursive neural tensor network may receive an instruction sequence that includes a sequence of tokens (e.g., a sequence of n tokens $(T_1, T_2, \ldots T_n)$). In some example embodiments, the recursive neural tensor network may receive an abstract syntax tree representation of the instruction sequence.

The trained recursive neural tensor network may process the instruction sequence to determine a classification for the instruction sequence (904). For instance, the trained recursive neural tensor network may process the abstract syntax tree representation of the instruction sequence, which preserves the structure present the instruction sequence (e.g., one or more rules for combining tokens in the instruction sequence). Processing the instruction sequence includes assigning weights and tensors that have been optimized (e.g., during training) to minimize an error in the classification of the instruction sequence. A classification of the instruction sequence may be determined based on a weight that is assigned to the root node of the instruction sequence.

The trained recursive neural tensor network may provide, as an output, a classification of the instruction sequence (906). For example, the result of the processing performed by the trained recursive neural tensor network may be a classification of the instruction sequence as malicious or benign. The trained recursive neural tensor network may provide the classification as an output.

Figure 10:
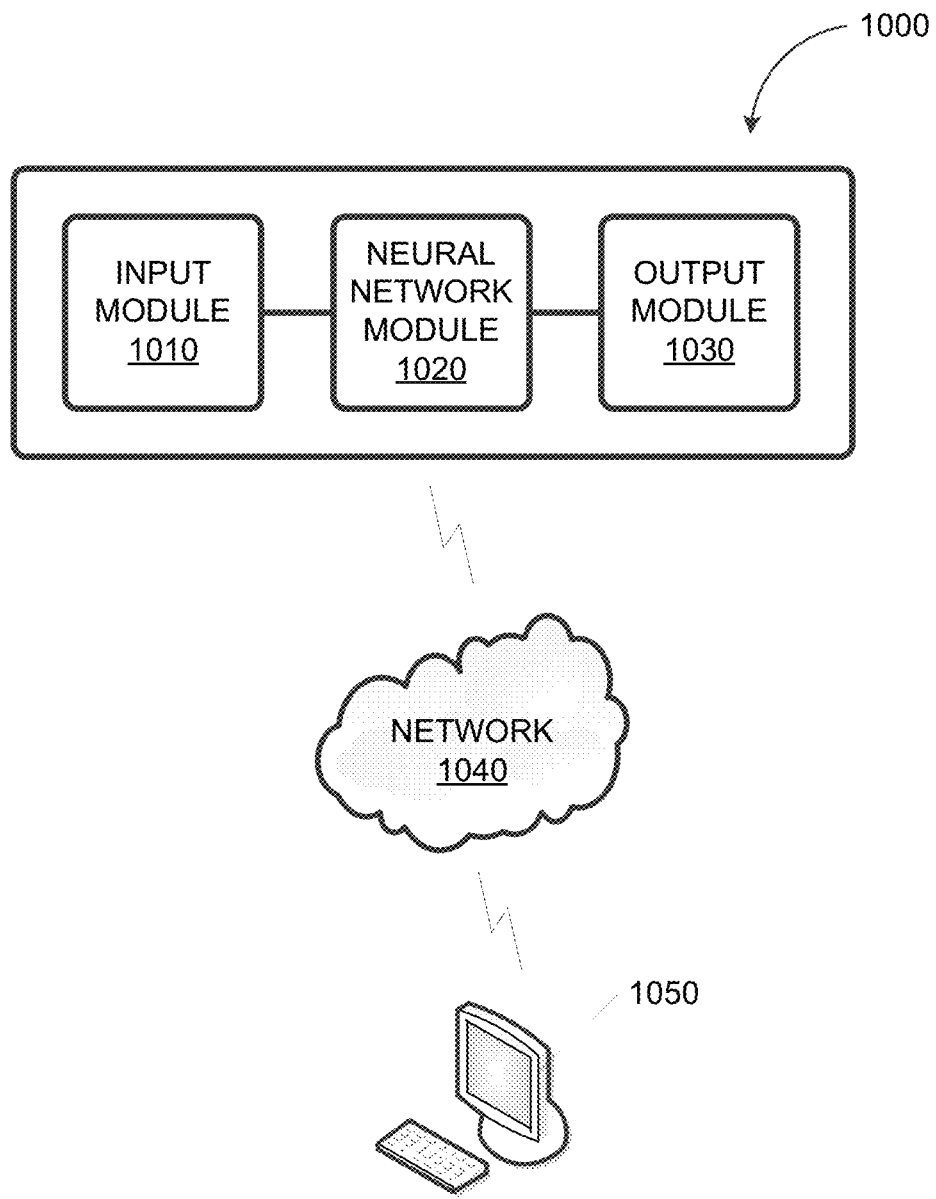
FIG. 10 depicts a block diagram illustrating a neural network system, in accordance with some example embodiments.

FIG. 10 depicts a block diagram illustrating a neural network system 1000, in accordance with some example embodiments. In some example embodiments, the neural network system 1000 may be realized in digital electronic circuitry, integrated circuitry, specially designed application specific integrated circuits (ASICs), field programmable gate arrays (FPGAs) computer hardware, firmware, software, and/or combinations thereof.

As shown in FIG. 10, the neural network system 1000 can include an input module 1010, a neural network module 1020, and an output module 1030. The neural network system 1000 may further be communicatively coupled with one or more devices including, for example, a device 1050. The neural network system 1000 may communicate with the device 1050 via a wired and/or wireless network 1040 (e.g., a wide area network (WAN), a local area network (LAN), and/or the Internet).

Referring to FIGS. 1-10, the neural network module 1020 may implement a long short-term memory neural network (e.g., the long short-term memory neural network 100 and/or the long short-term memory neural network 200). As such, the neural network module 1020 may be configured to implement one or more layers of a long short-term memory neural network including, for example, an embedding layer, at least one long short-term memory layer, a dropout layer, a fully connected layer, and/or an activation layer. Alternately or additionally, the neural network module 1020 may implement a recursive neural tensor network.

According to some example embodiments, the neural network module 1020 may be configured to process one or more instruction sequences (e.g., training and/or actual input instruction sequences) received by the input module 1010 (e.g., from the device 1050 or another source). The neural network module 1020 may be further configured to generate a classification of the one or more instruction sequences (e.g., as malicious or benign). The classification of one or more instruction sequences may be provided (e.g., to the device 1050) via the output module 1030.

Implementations of the present disclosure can include, but are not limited to, methods consistent with the description provided above as well as articles that comprise a tangibly embodied machine-readable medium operable to cause one or more machines (e.g., computers, etc.) to result in operations implementing one or more of the described features. Similarly, computer systems are also described that can include one or more processors and one or more memories coupled to the one or more processors. A memory, which can include a computer-readable storage medium, can include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital Mill image capture devices and associated interpretation software, and the like.

In the description above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claim.

What is claimed is:

1. A system for detecting malicious instruction sequences in a script which, when executed causes undesirable or harmful behavior to a computing device, the system comprising:

at least one processor; and at least one memory including program code which when executed by the at least one processor provides operations comprising:

tokenizing a plurality of historical instruction sequences each forming part of a different script to generate training data, wherein the instruction sequences are configured to be executed without compilation;

training, based at least on the training data, at least one machine learning model to detect one or more predetermined interdependencies amongst a plurality of tokens in the training data, wherein at least one of the predetermined interdependencies indicates that the corresponding instructions sequence is malicious, the trained at least one machine learning model using encoding to vectorize instruction sequences so as to preserve similarities between tokens; and providing the trained at least one machine learning model to enable classification of one or more instruction sequences as either being malicious or benign based on the detected one or more predetermined interdependencies, the trained at least one machine learning model, when deployed, being used to prevent instruction sequences classified as malicious from being executed and causing undesirable or harmful behavior to the computing device;

wherein:

the trained at least one machine learning model comprises a recursive neural tensor network that assigns weights and tensors to nodes and connections of an abstract syntax tree representation of the instruction sequence such that a weight of a parent node p in the abstract syntax tree representation is based on:

$$p = f\left(\begin{bmatrix} c_1 \\ c_2 \end{bmatrix} V \begin{bmatrix} c_1 \\ c_2 \end{bmatrix} + W \begin{bmatrix} c_1 \\ c_2 \end{bmatrix}\right),$$

wherein $c_1$, and $c_2$, correspond to scores assigned to children nodes in the abstract syntax tree representation, wherein tensor V and weight W connect the children nodes to the parent node, wherein a tensor V is defined as $V \in R^{2d \times 2d \times d}$, and wherein d is a dimension of a vector representing a token;

the abstract syntax tree representation of the instruction sequence preserves a structure of the instruction sequence including one or more rules for combining the tokens in the instruction sequence;

the encoding maximizes an objective function $J(\theta)$ in order to generate v vector representations that preserve similarities between tokens:

$$J(\theta) = \frac{1}{T} \sum_{t=1}^{T} \sum_{-c \leq j \leq c, j \neq 0} \log p(w_{t+j} | w_t),$$

wherein T is a total number of tokens in a training corpus, $w_t$ is a current token, c is a window size, $w_{t+j}$ represents a token in a window before or after $w_t$, and $p(w_{t+j}|w_t)$ represents a probability of $w_{t+j}$ given $w_t$, wherein $p(w_{t+j}|w_t)$ is:

$$p(w_{t+j} | w_t) = \frac{\exp(v'^T_{w_{t+j}} v_{w_t})}{\sum_{w=1}^{W} \exp(v'^T_w v_{w_t})},$$

wherein W is a number of words in a vocabulary in a plurality of training instruction sequences and there are n tokens $(T_1, T_2, \ldots T_n)$ and $V_w$ and $v'_w$ are input and output vector representations of w;

the trained at least one machine learning model comprises a second machine learning model that is different than the recursive neural tensor network that is configured to detect one or more predetermined interdependencies in one direction by at least processing the plurality of tokens in a forward order and to detect one or more other predetermined interdependencies in an opposite direction by at least processing the plurality of tokens in an opposite order.

2. The system of claim 1 further comprising:
receiving the training data, wherein the training data comprises a sequence of instructions.

3. The system of claim 2, wherein the sequence of instructions includes the plurality of tokens, and wherein at least one of the plurality of tokens comprises at least one character and/or binary digit.

4. The system of claim 1, wherein the one or more predetermined interdependencies include a presence, in the training data, of a first token subsequent to at least a second token.

5. The system of claim 1, wherein the one or more predetermined interdependencies indicate at least one function and/or behavior associated with the training data.

6. The system of claim 1, wherein a first layer of the trained at least one machine learning model encodes the tokens using one or more encoding techniques and generates vector representations of the tokens to pass to a next layer of the trained at least one machine learning model.

7. The system of claim 6, wherein the second machine learning model comprises a long short-term memory neural network.

8. The system of claim 7, wherein the long short-term memory neural network comprises an embedding layer configured to generate vector representations of the plurality of tokens in the training data.

9. The system of claim 8, wherein the embedding layer is configured to use one-hot encoding to generate the vector representations of the plurality of tokens in the training data.

10. The system of claim 8, wherein the embedding layer is configured word2vec to generate the vector representations of the plurality of tokens in the training data.

11. The system of claim 7, wherein the long short-term memory neural network comprises a first long short-term memory layer, and wherein the first long short-term memory layer comprises a memory cell having an input gate, an output gate, and a forget gate.

12. The system of claim 11, wherein the first long short-term memory layer is configured to receive a first token from the plurality of tokens included in the training data.

13. The system of claim 12, wherein a current hidden state of the first long short-term memory layer is determined based at least on the first token and a previous hidden state of the first long-short term memory layer, wherein the previous hidden state of the first long short-term memory layer corresponds to one or more tokens already processed by the long short-term memory neural network, and wherein an output of the first long-short term memory layer corresponds to the current hidden state of the first long short-term memory layer.

14. The system of claim 11, wherein the long short-term memory neural network further comprises a second long short-term memory layer, wherein the first long short-term memory layer is configured to detect one or more predetermined interdependencies in one direction by at least processing the plurality of tokens in a forward order, and wherein the second long short-term memory layer is configured to detect one or more other predetermined interdependencies in an opposite direction by at least processing the plurality of tokens in an opposite order.

15. The system of claim 1, wherein training the recursive neural tensor network includes processing an abstract syntax tree representation of the training data with the recursive neural tensor network.

16. The system of claim 15, further comprising:
generating, based at least on a structure of the plurality of tokens in the training data, the abstract syntax tree representation of the training data.

17. The system of claim 16, wherein the abstract syntax tree representation of the training data includes a parent node corresponding to a first token from the plurality of tokens in the training data, and a leaf node corresponding to a second token from the plurality of tokens in the training data, and wherein the leaf node comprises a child node of the parent node.

18. The system of claim 17, wherein the first token indicates a rule for combining the second token and a third token from the plurality of tokens in the training data.

19. The system of claim 18, wherein the parent node is associated with a weight that is determined based at least on a first weight and a first tensor associated with the leaf node, and a second weight and a second tensor associated with another leaf node corresponding to the third token.

20. A computer-implemented method for detecting malicious instruction sequences in a script which, when executed causes undesirable or harmful behavior to a computing device, the method comprising:
receiving a plurality of instructions sequences that are configured to be executed without compilation;
classifying, using a plurality of machine learning models trained using training data, the instruction sequences as either being malicious or benign based on a detected one or more predetermined interdependencies, the training data comprising a plurality of tokenized historical instruction sequences each forming part of a different script to generate training data, at least one of the trained machine learning models using encoding to vectorize instruction sequences so as to preserve similarities between tokens; and
preventing the instruction sequences classified as malicious from being executed thereby avoiding the instructions sequences from causing undesirable or harmful behavior to the computing device;
wherein a first of the plurality of machine learning models comprises a recursive neural tensor network that assigns weights and tensors to nodes and connections of an abstract syntax tree representation of the instruction sequence such that a weight of a parent node p in the abstract syntax tree representation is based on:

$$p = f\left(\begin{bmatrix} c_1 \\ c_2 \end{bmatrix} V \begin{bmatrix} c_1 \\ c_2 \end{bmatrix} + W \begin{bmatrix} c_1 \\ c_2 \end{bmatrix}\right),$$

wherein $c_1$, and $c_2$, correspond to scores assigned to children nodes in the abstract syntax tree representation, wherein tensor V and weight W connect the children nodes to the parent node, wherein a tensor V is defined as $W \in R^{2d \times 2d \times d}$, and wherein d is a dimension of a vector representing a token:
the abstract syntax tree representation of the instruction sequence preserves a structure of the instruction sequence including one or more rules for combining the tokens in the instruction sequence;

the encoding maximizes an objective function j(θ) in order to generate v vector representations that preserve similarities between tokens:

$$J(\theta) = \frac{1}{T} \sum_{t=1}^{T} \sum_{-c \leq j \leq c, j \neq 0} \log p(w_{t+j} | w_t),$$

wherein T is a total number of tokens in a training corpus, $w_t$ is a current token, c is a window size, $w_{t+j}$ represents a token in a window before or after $w_t$, and p ($w_{t+j}|w_t$) represents a probability of $w_{t+j}$ given $w_t$, wherein $p(w_{t+j}|w_t)$ is:

$$p(w_{t+j} | w_t) = \frac{\exp(v'^T_{w_{t+j}} v_{w_t})}{\sum_{w=1}^{W} \exp(v'^T_{w} v_{w_t})},$$

wherein W is a number of words in a vocabulary in a plurality of training instruction sequences and there are n tokens ($T_1, T_2, \ldots T_n$) and $V_w$ and $v'_w$ are input and output vector representations of w;

wherein a second of the plurality of machine learning models comprises a long short-term memory neural network, wherein the long short-term memory neural network comprises an embedding layer configured to generate vector representations of the plurality of tokens in the training data, wherein the long short-term memory neural network comprises a first long short-term memory layer, wherein the first long short-term memory layer comprises a memory cell having an input gate, an output gate, and a forget gate, the first long short-term memory layer is configured to receive a first token from the plurality of tokens included in the training data, the long short-term memory neural network further comprises a second long short-term memory layer, wherein the first long short-term memory layer is configured to detect one or more predetermined interdependencies in one direction by at least processing the plurality of tokens in a forward order, and wherein the second long short-term memory layer is configured to detect one or more other predetermined interdependencies in an opposite direction by at least processing the plurality of tokens in an opposite order.

21. The method of claim 20, wherein a first layer of one of the trained machine learning models encodes the tokens using word2vec encoding and generates vector representations of the tokens to pass to a next layer of such trained machine learning model, the word2vec encoding maximizes an objective function J(θ) in order to generate vector representations that preserve similarities between tokens.

22. A computer-implemented method for detecting malicious instruction sequences in a script which, when executed causes undesirable or harmful behavior to a computing device, the method comprising tokenizing a plurality of historical instruction sequences each forming part of a different script to generate training data, wherein the instruction sequences are configured to be executed without compilation;

training, based at least on the training data, two machine learning models to detect one or more predetermined interdependencies amongst a plurality of tokens in the training data, wherein at least one of the predetermined interdependencies indicates that the corresponding instructions sequence is malicious, the two trained machine learning models using encoding to vectorize instruction sequences so as to preserve similarities between tokens; and providing the trained machine learning models to enable classification of one or more instruction sequences as either being malicious or benign based on the detected one or more predetermined interdependencies, the trained machine learning models, when deployed, being used to prevent instruction sequences classified as malicious from being executed and causing undesirable or harmful behavior to the computing device;

wherein:

a first of the trained machine learning models comprises a recursive neural tensor network that assigns weights and tensors to nodes and connections of an abstract syntax tree representation of the instruction sequence such that a weight of a parent node p in the abstract syntax tree representation is based on:

$$p = f\left(\begin{bmatrix} c_1 \\ c_2 \end{bmatrix} V \begin{bmatrix} c_1 \\ c_2 \end{bmatrix} + W \begin{bmatrix} c_1 \\ c_2 \end{bmatrix}\right),$$

wherein $c_1$, and $c_2$, correspond to scores assigned to children nodes in the abstract syntax tree representation, wherein tensor V and weight W connect the children nodes to the parent node, wherein a tensor V is defined as $V \in R^{2d \times 2d \times d}$, and wherein d is a dimension of a vector representing a token;

the abstract syntax tree representation of the instruction sequence preserves a structure of the instruction sequence including one or more rules for combining the tokens in the instruction sequence;

the encoding maximizes an objective function j(θ) in order to generate v vector representations that preserve similarities between tokens:

$$J(\theta) = \frac{1}{T} \sum_{t=1}^{T} \sum_{-c \leq j \leq c, j \neq 0} \log p(w_{t+j} | w_t),$$

wherein T is a total number of tokens in a training corpus, $w_t$ is a current token, c is a window size, $w_{t+j}$ represents a token in a window before or after $w_t$, and $p(w_{t+j}|w_t)$ represents a probability of $w_{t+j}$ given $w_t$, wherein $p(w_{t+j}|w_t)$ is:

$$p(w_{t+j} | w_t) = \frac{\exp(v'^T_{w_{t+j}} v_{w_t})}{\sum_{w=1}^{W} \exp(v'^T_{w} v_{w_t})},$$

wherein W is a number of words in a vocabulary in a plurality of training instruction sequences and there are n tokens ($T_1, T_2 \ldots T_n$) and $V_w$ and $v'_w$ are input and output vector representations of w;

a second of the trained machine learning models is configured to detect one or more predetermined interdependencies in one direction by at least processing the plurality of tokens in a forward order and to detect one or more other predetermined interdependencies in an opposite direction by at least processing the plurality of tokens in an opposite order.

* * * * *